United States Patent [19]

Parigi

[11] Patent Number: 4,488,884
[45] Date of Patent: Dec. 18, 1984

[54] PROCESS FOR THE PRODUCTION OF AQUEOUS HYDROCHLORIC ACID HAVING A CONCENTRATION OF AT LEAST 35.5% BY WEIGHT

[75] Inventor: Joseph V. Parigi, Baytown, Tex.

[73] Assignee: Mobay Chemical Corporation, Pittsburgh, Pa.

[21] Appl. No.: 543,563

[22] Filed: Oct. 19, 1983

[51] Int. Cl.³ .............................................. B01D 47/00
[52] U.S. Cl. .......................................... 55/71; 423/488
[58] Field of Search ............................ 55/71; 423/488

[56] References Cited

U.S. PATENT DOCUMENTS

| | | | |
|---|---|---|---|
| 2,909,240 | 10/1959 | Colton | 55/71 |
| 3,666,424 | 5/1972 | Cox | 23/312 R |
| 3,807,139 | 4/1974 | DiFiore et al. | 55/71 |
| 4,349,524 | 9/1982 | Yamashita et al. | 423/488 |

OTHER PUBLICATIONS

Chemical Engineering Progress, vol. 69, No. 2, Feb. 1973, pp. 50–52, "Adiabatic and Falling Film Absorption of Hydrogen Chloride", C. E. Hulswitt.

Primary Examiner—Bernard Nozick
Attorney, Agent, or Firm—Gene Harsh; Joseph C. Gil

[57] ABSTRACT

The present invention is directed to a process for continuously producing aqueous hydrochloric acid having a concentration of at least 3.5% by weight comprising:
(a) continuously introducing water to the top of an absorption unit,
(b) continuously introducing a gas stream containing anhydrous hydrogen chloride to the bottom of said absorption unit,
(c) removing an overhead gaseous stream from said unit, said gaseous stream containing no more than 3% by weight, and preferably no more than 1% by weight hydrogen chloride, and
(d) removing a bottom liquid stream from said unit, said bottom stream containing at least 35.5% by weight hydrogen chloride, and
(e) returning a portion of said bottom stream to said unit.

4 Claims, 1 Drawing Figure

PROCESS FOR THE PRODUCTION OF AQUEOUS HYDROCHLORIC ACID HAVING A CONCENTRATION OF AT LEAST 35.5% BY WEIGHT

BACKGROUND OF THE INVENTION

As is known in the art, hydrogen chloride readily absorbs in water. One well known technique for the production of aqueous hydrochloric acid is the use of a so-called adiabatic absorber unit. In using this technique, feed gas containing hydrogen chloride is fed to the bottom of a contact tower. The gas is counter-currently contacted by the absorbing medium (typically water). As is recognized in the art, the term "adiabatic" is a misnomer since the process is operated as an isothermal process (constant temperature) rather than an adiabatic process (constant enthalpy). Acid strengths up to 34% are easily made in the known adiabatic systems. However, attempts to produce stronger acid results in a rapid decrease in absorption efficiency. Background information relative to the known adiabatic process can be found in Chemical Engineering Progress, Vol. 69, No. 2, February, 1973, pages 50–52, "Adiabatic and Falling Film Absorption of Hydrogen Chloride", C. E. Hulswitt; and, U.S. Pat. No. 3,807,139. Finally, a relatively complex process is known for the production of 35.5% hydrogen chloride, which process requires at least two separate absorption units. See U.S. Pat. No. 3,666,424.

It is an object of the present invention to continuously produce aqueous hydrochloric acid having a concentration of at least 35.5% by weight, and preferably from 35.5 to 37% by weight, in a simple and efficient process.

BRIEF DESCRIPTION OF THE DRAWING

FIG. I schematically illustrates a preferred embodiment of the present invention.

DESCRIPTION OF THE INVENTION

Figure 1:
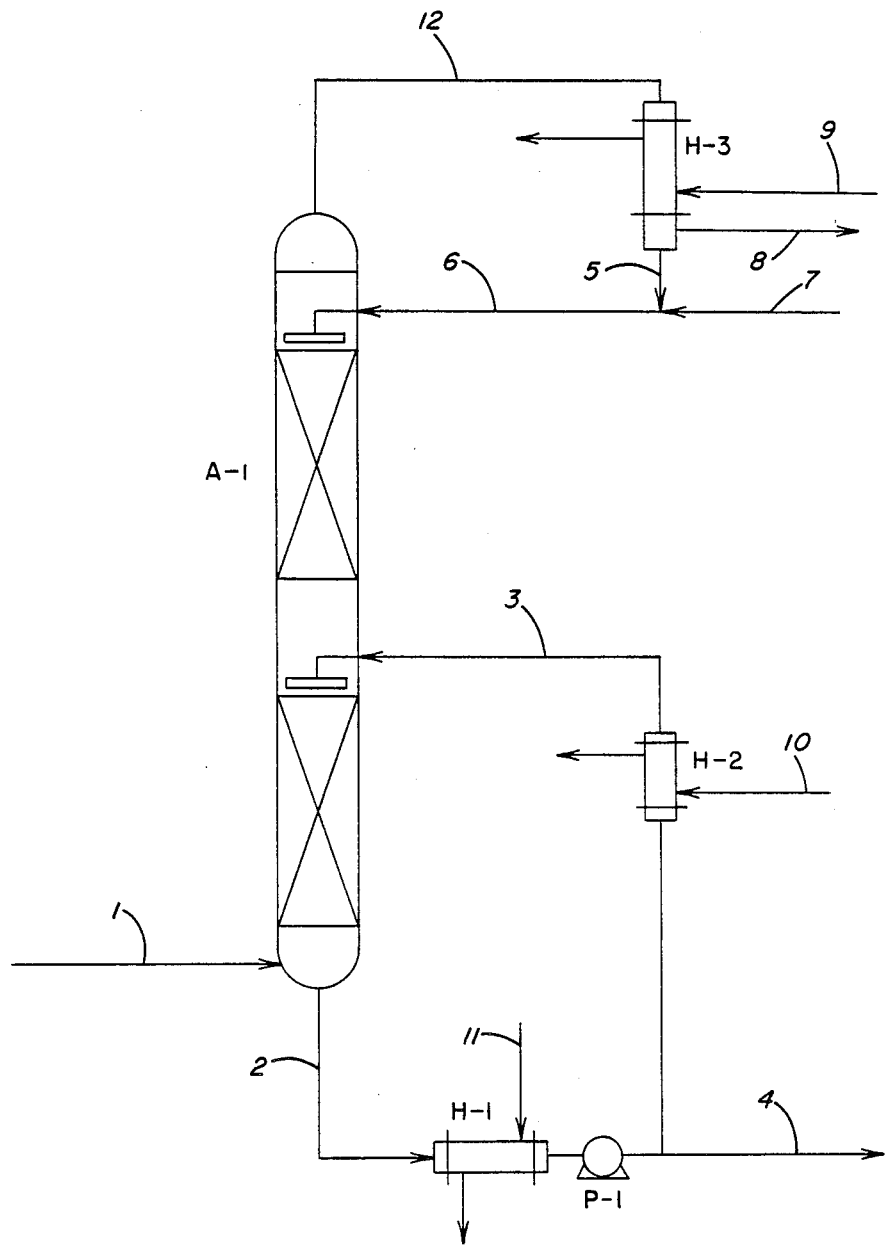

The object of the present invention is attained by merely providing the known absorption unit with a bottoms reflux stream. By following this simple expedient it is now possible to produce aqueous hydrochloric acid having a concentration of at least 35.5% by weight continuously and efficiently. Thus, the present invention is directed to a process for continuously producing aqueous hydrochloric acid having a concentration of at least 35.5% by weight, and preferably from 35.5 to 37% by weight, and most preferably from 36 to 37% by weight, comprising:

(a) continuously introducing water to the top of an absorption unit, (b) continuously introducing a gas stream containing anhydrous hydrogen chloride to the bottom of said unit, (c) removing an overhead gaseous stream from said unit, said gaseous stream containing no more than 3% by weight, and preferably no more than 1% by weight, hydrogen chloride, (d) removing a bottom liquid stream from said unit, said bottom stream containing at least 35.5% by weight hydrogen chloride, and (e) returning a portion of said bottom stream to said unit.

In describing the details of the present invention, reference will now be made to the drawing.

A gas stream containing anhydrous hydrogen chloride is fed via line 1 to an absorption unit, A-1. The gas flow rate can vary over wide limits depending upon the design of the particular absorption unit and will generally be in the range of from 40,000 to 125,000 cubic feet per hour. Likewise, the temperature of the gas stream can vary over wide limits and will generally be in the range of from 0° to 30° C. The absorption unit, in the preferred embodiment, is a packed tower of the type generally known in the art. Towers packed with plastic or ceramic saddles, Rashig rings or pall rings are eminently suitable for purposes of the present invention. The unit is operated at the boiling point of the desired product acid.

The composition of the gaseous stream can vary depending upon any associated facilities. Thus, for example, in the presently preferred process, the gas stream contains about 90% by weight of anhydrous hydrogen chloride and is a by-product stream from the production of toluene diisocyanate. This gaseous by-product is generated by the phosgenation of toluene diamine and generally contains about 10% inert gases and trace amounts of organic solvents used in the manufacture of toluene diisocyanate (e.g., orthodichlorobenzene). As noted however, any gas stream containing anhydrous hydrogen chloride can be used according to the present invention. In general, such gas stream can contain from 80 to 98% by volume of hydrogen chloride.

Fresh water is introduced at the top of the absorption unit A-1 via line 7 in order to absorb the hydrogen chloride vapors traveling up unit A-1. The product acid removed via line 4 has a concentration of at least 35.5% by weight, while the gas exiting through line 12 contains only small quantities of hydrogen chloride.

The feed gas entering unit A-1 through line 1 first contacts liquid which includes liquid being recycled around the bottom section of the unit. The product stream exits unit A-1 through line 2 at a concentration of at least 35.5% by weight of hydrochloric acid. This stream is cooled in heat exchanger H-1 by cooling water supplied through line 11. The cooled stream is then pumped via pump P-1 to two locations. One stream is sent via line 4 to storage. The remaining portion goes through line 3 back to the absorption unit A-1. It is generally preferred that prior to re-entering unit A-1, the recycle stream is again cooled, e.g., in heat exchanger H-2 using cooling water supplied via line 10. Upon entering the unit A-1, stream 3 mixes with the liquid flowing down from the top section of the absorption unit, resulting in a liquid having a concentration less than the concentration of the product leaving the unit via line 2. The liquid from the top section and the recycle stream is then preferably collected in a liquid distributor in a manner known in the art and is sent down unit A-1 to be reconcentrated via the up-flowing gas stream.

Upon exiting the bottom section of the absorption unit, the gas stream enters the top section of the unit. In the top section, the hydrogen chloride content of the gas stream is removed down to a content of from trace amounts to more than 3%, and preferably no more than 1% by weight. The gas stream exits unit A-1 through line 12.

In a particularly preferred embodiment, the gas stream is cooled in heat exchanger H-3 supplied with cooling water via line 9. Non-condensable gases exit exchanger H-3 via line 8 for further processing while the condensable portion of stream 12 is returned to unit A-1 via lines 5 and 6. In the presently preferred embodiment, stream 5 is mixed with fresh water from stream 7 and sent to unit A-1 via line 6.

The location of the feed point for stream 3 is dependent upon the diameter of the absorption unit in comparison to the gas feed stream 1. In general, the distance from the gas inlet at stream 1 to the recycle inlet at stream 3 should be at least 10 feet. This will generally be sufficient to supply enough theoretical stages of packing to raise the concentration of the down-coming liquid to the desired concentration at stream 2.

The height of the unit above the inlet for the recycle should be adequate to reduce the hydrogen chloride concentration of the up-flowing gas to less than 3% by weight at stream 12. Depending on the design of the column and size of the packing used, approximately 20 feet of packing is needed to provide the theoretical stages needed.

As is readily apparent, the weight ratio of the recycle stream 3 to the product stream 2 can vary over a wide range and is preferably from about 0.3:1 to about 0.8:1 and is most preferably about 0.5:1.

The various flow rates and temperatures of the various streams can be varied over wide limits. In general, the product stream exiting via line 4 will have a hydrogen chloride content of from 35.5 to 37% by weight and will be at a temperature of from 55° to 60° C. The flow rate via line 4 will generally be from about 17 to about 63 gallons per minute.

The recycle stream entering the unit via line 3 will have the same hydrogen chloride concentration as the product stream 4 and will preferably be at a temperature of from 25° to 45° C. The flow rate through line 3 will generally be from 35 to 70 gallons per minute.

In the preferred embodiment wherein the gas stream is cooled in heat exchanger H-3, the hydrogen chloride concentration in the condensate (line 5) will generally be from a trace amount up to 3% by weight, while the temperature of said condensate will be from 30° to 90° C. The flow rate through line 5 will generally range from 3 to 10 gallons per minute.

Finally, the flow rate to the absorption unit via line 6 will generally be from 10 to 42 gallons per minute.

Temperatures inside the absorption unit will follow the hydrogen chloride concentration boiling point curve and will range from 55° C. at the bottom of the unit to a high temperature of 108° C. at the location in the unit where the acid concentration is 22% by weight. The top of the column operates between 95° and 100° C.

The invention is further illustrated but is not intended to be limited by the following examples in which all parts and percentages are by weight unless otherwise specified.

EXAMPLE

The equipment shown in the drawing was used under the following conditions:
Feed gas: about 93% by weight anhydrous hydrogen chloride
Height of top section: 20 feet
Height of bottom section: 10 feet

| Stream | Temperature | Pressure | Flow |
|---|---|---|---|
| 1 | Ambient | Atmospheric | 12,300 lb/hr |
| 2 | 50° C. | Atmospheric | 62,600 lb/hr |
| 3 | 25° C. | — | 31,300 lb/hr |
| 4 | 40° C. | — | 31,300 lb/hr |
| 5 | 40° C. | $-30''$ $H_2O$ | 4,700 lb/hr |
| 6 | 30° C. | — | 25,000 lb/hr |
| 7 | 25° C. | — | 20,300 lb/hr |
| 8 | 40° C. | $-30''$ $H_2O$ | 800 lb/hr |

Stream 8 contained trace quantities of hydrogen chloride and 800 lb/hr of inert gases. Stream 5 contained about 1% by weight hydrogen chloride, while streams 2 and 4 had a hydrochloric acid concentration of 35.5% by weight and contained less than 5 ppm by weight of organic impurities.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A process for continuously producing aqueous hydrochloric acid having a concentration of at least 35.5% by weight comprising:
   (a) continuously introducing water to the top of an absorption unit,
   (b) continuously introducing a gas stream consisting essentially of 80–98% by volume anhydrous hydrogen chloride to the bottom of said absorption unit,
   (c) removing an overhead gaseous stream from said unit, said gaseous stream containing no more than 3% by weight, hydrogen chloride,
   (d) removing a bottom liquid stream from said unit, said bottom stream containing at least 35.5% by weight hydrogen chloride, and
   (e) returning a portion of said bottom stream to said unit, at a location above the point of introduction of the gas stream and below the point of introduction of the water.

2. The process of claim 1 wherein said bottom stream contains from 35.5 to 37% by weight hydrogen chloride.

3. The process of claim 1 wherein said overhead gaseous stream contains no more than 1% by weight hydrogen chloride.

4. The process of claim 1 wherein the weight ratio of the returned portion (e) to the bottom liquid stream (d) is from about 0.3:1 to about 0.8:1.

* * * * *